United States Patent
Miyoshi et al.

(10) Patent No.: US 7,892,446 B2
(45) Date of Patent: Feb. 22, 2011

(54) FERRITE MATERIAL

(75) Inventors: Yasuharu Miyoshi, Osaka (JP); Tomoyuki Tada, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 659 days.

(21) Appl. No.: 11/919,646

(22) PCT Filed: Sep. 12, 2006

(86) PCT No.: PCT/JP2006/318051
§ 371 (c)(1), (2), (4) Date: Oct. 31, 2007

(87) PCT Pub. No.: WO2007/032338
PCT Pub. Date: Mar. 22, 2007

(65) Prior Publication Data
US 2009/0050840 A1 Feb. 26, 2009

(30) Foreign Application Priority Data
Sep. 13, 2005 (JP) .............................. 2005-265071

(51) Int. Cl.
*H01F 1/34* (2006.01)
(52) U.S. Cl. ................ 252/62.61; 252/62.2; 252/62.62; 252/62.59
(58) Field of Classification Search ............. 252/62.61, 252/62.6, 62.62, 62.59
See application file for complete search history.

(56) References Cited

U.S. PATENT DOCUMENTS 3,640,867 A 2/1972 Iimura et al.
6,002,211 A 12/1999 Van Der Zaag et al.

FOREIGN PATENT DOCUMENTS

| | | | |
|---|---|---|---|
| EP | 0 139 324 A1 | | 5/1985 |
| EP | 140409 | * | 5/1985 |
| EP | 176115 | * | 4/1986 |
| EP | 1 547 988 A1 | | 6/2005 |
| JP | 54-145996 A | | 11/1979 |
| JP | 54-159696 A | | 12/1979 |
| JP | 60-76106 A | | 4/1985 |
| JP | 60-76107 A | | 4/1985 |
| JP | 1-179402 A | | 7/1989 |
| JP | 9-505269 A | | 5/1997 |
| JP | 11-87126 A | | 3/1999 |
| JP | 2000-269017 A | | 9/2000 |
| JP | 2002-060224 A | | 2/2002 |
| JP | 2004-153196 A | | 5/2004 |
| JP | 2004-153197 A | | 5/2004 |
| JP | 2005-053759 A | | 3/2005 |
| WO | WO-96/08449 A1 | | 3/1996 |

OTHER PUBLICATIONS

Chinese Office Action mailed Aug. 11, 2010 for Chinese Application No. 200680018710.0.
Extended European Search Report issued on Oct. 21, 2010 in corresponding European Patent Application No. 06 79 7843.

* cited by examiner

*Primary Examiner*—C. Melissa Koslow
(74) *Attorney, Agent, or Firm*—Birch, Stewart, Kolasch & Birch, LLP

(57) ABSTRACT

A ferrite material in which $Bi_2O_3$ is added at 6% by weight or less, and preferably 4% by weight or less, to a ferrite of Li—Zn—(Mn, Fe) containing a specified amount of Mn. In the ferrite material, change of magnetic permeability under high external stress is extremely small, and a core loss under a compression stress is small. By using this ferrite material, an inductor and transformer having small loss even in a state of being molded with resin can be obtained.

9 Claims, 4 Drawing Sheets

FIG. 1

| SAMPLE | MAIN COMPONENT COMPOSITION (mol%) | | | | ACCESSORY COMPONENT (wt%) Bi₂O₃ | $\mu i$ | $\mu i$ CHANGE RATE (%) | Pcv (kW/m³) | |
|---|---|---|---|---|---|---|---|---|---|
| | (Li₀.₅Fe₀.₅)O | ZnO | (Fe,Mn)₂O₃ (Fe IN (Li₀.₅Fe₀.₅)O IS EXCLUDED) | Mn/(Mn+Fe) (%) | | | | | |
| EX.2 | A1 | 35.0 | 15.0 | 50.0 | 4.0 | 1.0 | 148 | 1.0 | 6,770 |
| EX.2 | A2 | 32.0 | 18.0 | 50.0 | 4.0 | 1.0 | 180 | 0.5 | 5,870 |
| EX.1 | A3 | 30.0 | 20.0 | 50.0 | 4.0 | 1.0 | 211 | -1.0 | 5,870 |
| EX.1 | A4 | 28.0 | 22.0 | 50.0 | 4.0 | 1.0 | 255 | -1.5 | 5,700 |
| EX.1 | A5 | 25.0 | 25.0 | 50.0 | 4.0 | 1.0 | 306 | -2.0 | 5,040 |
| EX.1 | A6 | 23.0 | 27.0 | 50.0 | 4.0 | 1.0 | 300 | -5.0 | 5,920 |
| EX.1 | A7 | 20.0 | 30.0 | 50.0 | 4.0 | 1.0 | 280 | -7.0 | 6,800 |
| EX.2 | A8 | 18.0 | 32.0 | 50.0 | 4.0 | 1.0 | 210 | -12.0 | 7,180 |
| EX.1 | A9 | 26.0 | 26.0 | 48.0 | 4.0 | 1.0 | 292 | -5.0 | 6,280 |
| EX.1 | A10 | 28.5 | 23.5 | 48.0 | 4.0 | 1.0 | 253 | -1.3 | 5,640 |
| EX.1 | A11 | 27.5 | 27.5 | 45.0 | 4.0 | 1.0 | 210 | -7.0 | 9,080 |
| EX.2 | A12 | 30.0 | 25.0 | 45.0 | 4.0 | 1.0 | 220 | -3.0 | 8,580 |
| EX.2 | A13 | 32.0 | 25.0 | 43.0 | 4.0 | 1.0 | 150 | -2.0 | 9,190 |
| EX.1 | A14 | 24.0 | 24.0 | 52.0 | 4.0 | 1.0 | 280 | -1.0 | 5,470 |
| EX.1 | A15 | 18.0 | 30.0 | 52.0 | 4.0 | 1.0 | 350 | -4.0 | 6,560 |
| EX.2 | A16 | 22.0 | 23.0 | 55.0 | 4.0 | 1.0 | 205 | 0.0 | 7,170 |
| EX.2 | A17 | 15.0 | 30.0 | 55.0 | 4.0 | 1.0 | 300 | -9.0 | 7,180 |

EX.1 : ADAPTATION EXAMPLE
EX.2 : COMPARATIVE EXAMPLE

FIG. 2

| | SAMPLE | MAIN COMPONENT COMPOSITION (mol%) | | | | ACCESSORY COMPONENT (wt%) Bi$_2$O$_3$ | $\mu i$ | $\mu i$ CHANGE RATE (%) | Pcv (kW/m$^3$) |
|---|---|---|---|---|---|---|---|---|---|
| | | (Li$_{0.5}$Fe$_{0.5}$)O | ZnO | (Fe,Mn)$_2$O$_3$ (Fe IN(Li$_{0.5}$Fe$_{0.5}$)O IS EXCLUDED) | Mn/(Mn+Fe) (%) | | | | |
| EX.2 | B1 | 25.0 | 25.0 | 50.0 | 0.0 | 1.0 | 341 | −2 | 7,230 |
| EX.1 | B2 | 25.0 | 25.0 | 50.0 | 1.0 | 1.0 | 327 | −1.2 | 6,120 |
| EX.1 | B3 | 25.0 | 25.0 | 50.0 | 4.0 | 1.0 | 305 | −2.3 | 5,040 |
| EX.1 | B4 | 25.0 | 25.0 | 50.0 | 6.0 | 1.0 | 305 | −0.4 | 4,850 |
| EX.1 | B5 | 25.0 | 25.0 | 50.0 | 10 | 1.0 | 309 | 0.6 | 4,590 |
| EX.1 | B6 | 25.0 | 25.0 | 50.0 | 15 | 1.0 | 322 | 0.4 | 4,780 |
| EX.1 | B7 | 25.0 | 25.0 | 50.0 | 25 | 1.0 | 390 | 0.25 | 6,130 |
| EX.2 | B8 | 25.0 | 25.0 | 50.0 | 30 | 1.0 | 430 | 0.2 | 7,540 |

EX.1 : ADAPTATION EXAMPLE
EX.2 : COMPARATIVE EXAMPLE

FIG. 3

|  | SAMPLE | MAIN COMPONENT COMPOSITION (mol%) | | | | ACCESSORY COMPONENT (wt%) | SINTERING TEMPERATURE (°C) | $\mu i$ | $\mu i$ CHANGE RATE (%) | $P_{cv}$ (kW/m³) |
|---|---|---|---|---|---|---|---|---|---|---|
|  |  | $(Li_{0.5}Fe_{0.5})O$ | ZnO | $(Fe,Mn)_2O_3$ (Fe IN $(Li_{0.5}Fe_{0.5})O$ IS EXCLUDED) | Mn/(Mn+Fe) (%) | $Bi_2O_3$ | | | | |
| EX.2 | C1 | 25.0 | 25.0 | 50.0 | 10.0 | 0.00 | 1,000 | 257 | −0.7 | 7,860 |
| EX.2 | C2 | 25.0 | 25.0 | 50.0 | 10.0 | 0.10 | 1,000 | 233 | −1.7 | 8,320 |
| EX.1 | C3 | 25.0 | 25.0 | 50.0 | 10.0 | 0.20 | 1,000 | 242 | 0.1 | 6,730 |
| EX.1 | C4 | 25.0 | 25.0 | 50.0 | 10.0 | 0.50 | 930 | 288 | 0.4 | 5,320 |
| EX.1 | C5 | 25.0 | 25.0 | 50.0 | 10.0 | 1.0 | 930 | 309 | 0.6 | 4,590 |
| EX.1 | C6 | 25.0 | 25.0 | 50.0 | 10.0 | 2.0 | 930 | 293 | 0.8 | 4,930 |
| EX.1 | C7 | 25.0 | 25.0 | 50.0 | 10.0 | 6.0 | 930 | 223 | 1 | 6,370 |
| EX.2 | C8 | 25.0 | 25.0 | 50.0 | 10.0 | 12.0 | 930 | 120 | 1.1 | 7,940 |

EX.1 : ADAPTATION EXAMPLE
EX.2 : COMPARATIVE EXAMPLE

FIG. 4

| | SAMPLE | MAIN COMPONENT COMPOSITION (mol%) | | | | ACCESSORY COMPONENT (wt%) | | | | $\mu i$ | $\mu i$ CHANGE RATE (%) | Pcv (kW/m³) |
|---|---|---|---|---|---|---|---|---|---|---|---|---|
| | | $(Li_{0.5}Fe_{0.5})O$ | ZnO | $(Fe,Mn)_2O_3$ (Fe IN $(Li_{0.5}Fe_{0.5})O$ IS EXCLUDED) | Mn/(Mn+Fe) (%) | $Bi_2O_3$ | $ZrO_2$ | $SiO_2$ | $ZrSiO_4$ | | | |
| EX.1 | D1 | 25.0 | 25.0 | 50.0 | 4.0 | 1.0 | | | | 286 | −0.9 | 5,310 |
| EX.1 | D2 | 25.0 | 25.0 | 50.0 | 4.0 | 1.0 | 1.0 | | | 243 | −0.2 | 6,670 |
| EX.2 | D3 | 25.0 | 25.0 | 50.0 | 4.0 | 1.0 | 5.0 | | | 160 | 0.4 | 7,700 |
| EX.1 | D4 | 25.0 | 25.0 | 50.0 | 4.0 | 1.0 | 7.0 | | | 278 | −1.2 | 5,810 |
| EX.1 | D5 | 25.0 | 25.0 | 50.0 | 4.0 | 1.0 | | 1.0 | | 218 | −0.5 | 6,950 |
| EX.2 | D6 | 25.0 | 25.0 | 50.0 | 4.0 | 1.0 | | 5.0 | | 135 | 0.5 | 9,870 |
| EX.1 | D7 | 25.0 | 25.0 | 50.0 | 4.0 | 1.0 | | 7.0 | | 275 | −1.4 | 5,370 |
| EX.1 | D8 | 25.0 | 25.0 | 50.0 | 4.0 | 1.0 | | | 1.0 | 210 | −0.3 | 6,730 |
| EX.2 | D9 | 25.0 | 25.0 | 50.0 | 4.0 | 1.0 | | | 5.0 | 103 | 0.6 | 8,530 |

EX.1 : ADAPTATION EXAMPLE
EX.2 : COMPARATIVE EXAMPLE

FERRITE MATERIAL

This application is the normal phase under phase 35 U.S.C §371 of PCT International Application No. PCT/JP2006/318051 which has an International filing date of Sep. 12, 2006, which designated the United State of America.

TECHNICAL FIELD

The present invention relates to a ferrite material used in a core material of an inductor or a transformer or the like which is used for a power supply circuit or the like and, more particularly, to a ferrite material which exhibit characteristics such as large initial magnetic permeability and small change in magnetic permeability with respect to compression stress by adding small amount of $Bi_2O_3$ to Li—Zn—(Fe, Mn) ferrite.

BACKGROUND ART

In recent years, a material for an inductor or a transformer which is used in a power supply circuit such as DC-DC converter requires, small loss in high-frequency and large-amplitude excitation for obtaining high conversion efficiency, small remnant magnetic flux density for obtaining a predetermined amount of change of magnetic flux density even in applying a direct-current bias magnetic field thereto, and high resistivity for ensuring electric insulation with a conductor.

In particular, for improving reliability as parts, an inductor or a transformer is generally molded in a resin, and in a device of such a resin molding type, it is known that compression stress is applied to a core material in curing the resin.

That is, because a magnetic permeability and a core loss in the ferrite material used in the core material are changed according to magnitude of compression stress, an inductance value and loss of the device are changed before and after molding with the resin. Therefore, for obtaining more stable device performance, it is needful to use a ferrite material having small change of a magnetic permeability and a core loss with respect to compression stress.

[Patent Document 1] Japanese Patent Application Laid-Open No. 11-87126
[Patent Document 2] Japanese Patent Application Laid-Open No. 1-179402
[Patent Document 3] Japanese Patent Application Laid-Open No. 2002-60224
[Patent Document 4] Japanese Patent Application Laid-Open No. 60-76107
[Patent Document 5] Japanese Patent Application Laid-Open No. 2000-269017
[Patent Document 6] Published Japanese Translation No. 9-505269 of the PCT Application

DISCLOSURE OF THE INVENTION

Problems to be Solved by the Invention

Conventionally, for suppressing fluctuation of inductance value due to stress, various ferrite materials containing Ni are proposed. However, for example, an initial magnetic permeability obtained in a material of Patent Document 1 is 100 or less, and a high initial magnetic permeability cannot be realized.

By adding a large amount of $Bi_2O_3$ or the like to a Ni-based ferrite, an inductance change rate due to external stress becomes small, but there is a problem that the initial magnetic permeability decreases (Patent Document 2). Moreover, in the case of adding a large amount of $Bi_2O_3$ to a Ni-based ferrite, there are problems that Hc increases and soft magnetic characteristics deteriorate.

In the material of Patent Document 3, a high initial magnetic permeability of 200 or more and anti-stress properties in a bar shape (a change rate of an effective magnetic permeability in a bar shape is small) are realized, but it is difficult to say that change of the initial magnetic permeability of the material is small.

Moreover, in a laminated inductor using a ferrite to which a large amount of $Bi_2O_3$ or the like is added, there is a problem that Ag diffusion in the internal conductor is easy to increase and that significant lowering of inductance L and Q is caused. A transformer using a ferrite to which a large amount of $Bi_2O_3$ or the like is added is not preferable in design because Bi is easy to diffuse in the furnace in heat treatment.

On the other hand, various ferrite materials for inductor or transformer which contain Li as a main component are proposed (Patent Documents 4 to 6), but are not the materials having characteristics that a initial magnetic permeability is large and that a change rate of a magnetic permeability with respect to compression stress is small.

The present invention has been achieved under such a circumstance, and an object of the present invention is to provide a ferrite material used in a core in which the initial magnetic permeability is large such as 200 or more and change of the initial magnetic permeability due to stress is small and the core loss is small.

Means for Solving the Problems

The present inventors have intensively studied about a composition of being capable of improving squareness ratio of BH loop which is a problem in a Li ferrite, and therefore, have found that $Bi_2O_3$ is added, preferably, a relatively large amount of $Bi_2O_3$ of 6% by weight or more is added to Li—Zn—Fe ferrite, and thereby the squareness ratio of BH loop becomes small, namely, Bs-Br value becomes large.

Moreover, the present inventors have found that in Li—Zn—Fe ferrite to which $Bi_2O_3$ is added, there are effects of lowering of a calcination temperature and improvement of fineness when some ZnO is substituted with CuO, and there is an improvement effect of resistivity when some $Fe_2O_3$ is substituted with $Mn_2O_3$.

Furthermore, the present inventors have studied various adding amounts of $Bi_2O_3$ in Li—Zn—Fe ferrite, and therefore, found that when 6% by weight or less, preferably, 5% by weight or less of $Bi_2O_3$ is added into Li—Zn—(Mn, Fe) ferrite containing a specified amount of Mn, a ferrite material having extremely small change of a magnetic permeability under a particularly high external stress can be obtained. And, the present invention has been accomplished.

That is, the ferrite material of the present invention has a composition formula of $x(Li_{0.5}Fe_{0.5})O \cdot yZnO \cdot z(Mn, Fe)_2O_3$, in which in a case of a=Mn/(Mn+Fe), $Bi_2O_3$ is added from 0.2% by weight to 6% by weight, to a material in which x, y, z, and a in the composition formula and in the condition satisfy the relations: $0.18 \leq x \leq 0.30$, $0.20 \leq y \leq 0.30$, $0.48 \leq z \leq 0.53$, $0.01 \leq a \leq 0.25$, and $x+y+z=1$.

In the present invention, in a ferrite material having the above-described constitution, the $Bi_2O_3$ may be substituted with $V_2O_5$ from 0.05% by weight to 0.5% by weight.

Moreover, in the present invention, in a ferrite material having the above-described constitution, the amount of $Bi_2O_3$ is from 0.2% by weight to 4% by weight.

Moreover, in the present invention, in a ferrite material having the above-described constitution, a portion ZnO may be substituted with CuO.

Moreover, in the present invention, in a ferrite material having the above-described constitution, it is preferable that at least one of $ZrO_2$, $ZrSiO_4$, and $SiO_2$ is contained 5% by weight or less.

Moreover, in the ferrite material of the present invention, a magnetic permeability is 200 or more and a change rate of the magnetic permeability when a pressure is applied at a pressure of 35 MPa is within ±10%.

Moreover, in the ferrite material of the present invention, a core loss at 1 MHz, 50 mT when a pressure is applied at a pressure of 35 MPa is 7000 kW/m³ or less.

EFFECTS OF THE INVENTION

In the present invention, a ferrite material in which the initial magnetic permeability is high such as 200 or more and in which also the change of the magnetic permeability with respect to stress is small and in which the core loss is small can be obtained, and can be applied to an inductor or a transformer, and particularly to an inductor or a transformer which is molded with a resin.

In the present invention, a ferrite in which the initial magnetic permeability is large and in which a change rate of the magnetic permeability with respect to compression stress is small can be obtained, and therefore, an inductor or a transformer in which variation of the inductance is small independently from magnitude of demagnetizing factor becomes possible to be obtained.

In the present invention, a ferrite having small core loss under compression stress can be obtained, and an inductor or a transformer having small core loss even becomes possible to be obtained even in the state of being molded with a resin.

BRIEF DESCRIPTION OF THE DRAWINGS

FIG. 1 is a table showing compositions and characteristics in Adaptation Examples of Embodiment 1 of the present invention/Comparative Examples;

FIG. 2 is a table showing compositions and characteristics in Adaptation Examples of Embodiment 1 of the present invention/Comparative Examples;

FIG. 3 is a table showing compositions and characteristics in Adaptation Examples of Embodiment 2 of the present invention/Comparative Examples; and FIG. 4 is a table showing compositions and characteristics in Adaptation Examples of Embodiment 3 of the present invention/Comparative Examples.

BEST MODES FOR IMPLEMENTING THE INVENTION

The ferrite material of the present invention has a main characteristic that a small amount of $Bi_2O_3$ is added to a Li—Zn—Fe ferrite containing a specified amount of Mn. Hereinafter, the reasons of limitation of the composition of the ferrite material according to the present invention will be described.

In a composition formula of $x(Li_{0.5}Fe_{0.5})O \cdot yZnO \cdot z(Mn, Fe)_2O_3$, x is a content ratio of $(Li_{0.5}Fe_{0.5})O$, and it is preferable that x is in the range of 0.18 to 0.30 (0.18 or more and 0.30 or less, and hereinafter, the meaning "to" is same). If less than 0.18, the improvement of Curie temperature cannot be obtained, and if more than 0.30, the initial magnetic permeability is small, and therefore both of the cases are not practical. The more preferable range is 0.22 to 0.27.

In a composition formula of $x(Li_{0.5}Fe_{0.5})O \cdot yZnO \cdot z(Mn, Fe)_2O_3$, y is a content ratio of ZnO, and it is preferable that y is in the range of 0.20 to 0.30. The case of less than 0.20 is not practical because the initial magnetic permeability of 200 or more cannot be obtained, and if more than 0.30, Curie temperature is low. That is, as described later, x+y+z=1 and the composition range of z is narrow and therefore, substantially, y is inversely proportional to x. The more preferable range is 0.23 to 0.28. By substituting some ZnO with CuO, densification in a lower calcinations temperature becomes possible. The preferable replacement rate is 0-0.5 (50% or less), and more than 0.5 is not preferable because the magnetic permeability lowers.

In a composition formula of $x(Li_{0.5}Fe_{0.5})O \cdot yZnO \cdot z(Mn, Fe)_2O_3$, z is a content ratio corresponding to $Fe_2O_3$, and Fe in $(Li_{0.5}Fe_{0.5})O$ is excluded, and the range of 0.48 to 0.53 is preferable. If less than 0.48, the high initial magnetic permeability cannot be obtained and the core loss increases, and if more than 0.53, the high magnetic permeability cannot be obtained and the core loss increases, and therefore both of the cases are not preferable. Some $Fe_2O_3$ is substituted with $Mn_2O_3$, but if the content of Mn is small, the magnetic permeability by stress and change of the core loss become large, and if the content of Mn is large, Curie temperature lowers and the core loss increases and therefore, it is preferable that a is 0.01 to 0.25 in the condition of a=Mn/(Mn+Fe). The more preferable range is 0.04 to 0.15.

In a composition formula of $x(Li_{0.5}Fe_{0.5})O \cdot yZnO \cdot z(Mn, Fe)_2O_3$, the above-described x, y, and z satisfy x+y+z=1.

Into a ferrite material composed of the above described $x(Li_{0.5}Fe_{0.5})O \cdot yZnO \cdot z(Mn, Fe)_2O_3$, $Bi_2O_3$ is added from 0.2% by weight to 6% by weight as an additional amount. The addition of the $Bi_2O_3$ is the characteristic of the present invention, and by the addition, the effect of the present invention can be exerted. The case of less than 0.2% by weight of $Bi_2O_3$ is not preferable because magnetic loss increases, and if more than 6% by weight of $Bi_2O_3$, it becomes difficult to achieve both of obtaining the high initial magnetic permeability to be an object and obtaining the characteristic that the change rate of the magnetic permeability with respect to compression stress is small. The preferable range is from 0.2% by weight to 4% by weight, and more preferably from 0.2% by weight to 2% by weight.

Moreover, in the present invention, some added $Bi_2O_3$ may be substituted with $V_2O_5$. The lower limit of the amount of $V_2O_5$ added is set to 0.05% by weight, and the upper limit thereof is set to 0.5% by weight. If the amount of $V_2O_5$ is less than 0.05% by weight, the magnetic loss increases, and if the amount of $V_2O_5$ is more than 0.5% by weight, the magnetic permeability lowers.

In the ferrite material having the above-described composition, for the purpose of reducing change of the initial permeability by stress, at least one of $ZrO_2$, $ZrSiO_4$, and $SiO_2$ can be added thereto. If the amount is more than 5% by weight even in single or combinatorial addition thereof, the high magnetic permeability cannot be obtained and the core loss increases and therefore, 5% by weight or less is added.

In the ferrite material according to the present invention, there can be obtained characteristics that the magnetic permeability is 200 or more and that a change rate of the magnetic permeability when a pressure is applied at a pressure of 35 MPa is within ±10%, and also the characteristic that a core loss at 1 MHz, 50 mT when a pressure is applied at a pressure of 35 MPa is 7,000 kW/m³ or less.

The ferrite material according to the present invention can be obtained by a producing method such as follows.

(1) A carbonate powder and an oxide powder serving as start materials are weighed and mixed so that the composition after calcinations is $x(Li_{0.5}Fe_{0.5})O \cdot yZnO \cdot z(Mn, Fe)_2O_3$ and, in the equation $a=Mn/(Mn+Fe)$, x, y, z, and a satisfy the following relations: $0.18 \leq x \leq 0.30$, $0.20 \leq y \leq 0.30$, $0.48 \leq z \leq 0.53$, $0.01 \leq a \leq 0.25$, and $x+y+z=1$ (2) The mixed powders are calcinated. It is preferable that the calcination temperature is 800° C. to 1,000° C. It is preferable that the calcination time is 2 hours to 5 hours. Moreover, it is preferable that the calcination atmosphere is an atmospheric air or oxygen atmosphere.

(3) The predetermined amount of the accessory component such as $Bi_2O_3$ is added to the calcinated powders after the calcination, and then, fine grinding is performed. It is preferable that the fine grinding is performed in pure water or in ethanol. Moreover, it is preferable that average-particle diameter of the ground powders after grinding is 0.5 μm to 1.5 μm. In addition, it is preferable that $Bi_2O_3$ or the like is added after the calcination before the fine grinding as described above, but may be added at a stage of material blending (the step (1)) or after the fine grinding.

(4) The ground powders after the fine grinding are molded by desired molding means. Before molding, if necessary, the ground powders may be granulated by a granulation apparatus. It is preferable that the molding pressure is from 70 MPa to 150 MPa.

(5) The molded body is sintered. It is preferable that the sintering atmosphere is an atmospheric air or oxygen atmosphere, and it is preferable that the sintering temperature is from 800° C. to 1050° C., particularly from 850° C. to 1000° C., and the sintering time is preferably 2 hours to 5 hours.

EMBODIMENTS

Embodiment 1

Material powders were mixed so as to finally become various main component composition ratios as shown in FIG. 1 and FIG. 2, and calcinated in an atmospheric air at 900° C. for 3 hours. $Bi_2O_3$ which was an accessory component as shown in FIG. 1 and FIG. 2 was added at 1.0% by weight to the obtained calcinated powders, and the powders were dried after performing wet-grinding by a ball mill.

7% by weight solution of polyvinyl alcohol was added at 14% by weight to the obtained powders, and then granulated to be granulated powders, and the granulated powders were molded under a molding pressure of $14.7 \times 10^4$ kPa into a ring shape of external diameter of 9 mm×inner diameter of 4 mm×thickness of 3 mm, and into a plate shape of long side of 30 mm×short side of 20 mm×thickness of 5 mm, and the obtained molded body was sintered in an atmospheric air under 930° C. for 3 hours.

A winding was applied to the obtained ring-shaped sintered body, and the initial magnetic permeability was measured by LCR meter, and the core loss (1 MHz, 50 mT) and BH loop at 3600 A/m were measured by BH analyzer. Moreover, a frame-shaped sample of long side of 8 mm×short side of 4 mm×thickness of 2 mm was cut from the plate-shaped sintered body, and a winding was applied to the sample and the magnetic permeability μi was measured. Moreover, a pressure was applied uniaxially at 35 MPa, and change rate of the magnetic permeability μi before and after applying the pressure and the core loss $P_{CV}$ were measured.

As is apparent from FIGS. 1 and 2, it was found that in Examples of the present invention, ferrites having a high magnetic permeability of 200 or more in which change of the magnetic permeability with respect to stress was small and in which the core loss under stress was small were obtained.

Embodiment 2

Material powders were mixed so as to finally become a specified main component composition ratio as shown in FIG. 3, and calcinated in an atmospheric air at 900° C. for 3 hours. $Bi_2O_3$ which was an accessory component as shown in FIG. 3 was added in various amounts from 0.0% by weight to 12.0% by weight to the obtained calcinated powders, and the powders were dried after performing wet-grinding by a ball mill.

7% by weight solution of polyvinyl alcohol was added at 14% by weight to the obtained powders, and then granulated to be granulated powders, and the granulated powders were molded under a molding pressure of $14.7 \times 10^4$ kPa into a ring shape of external diameter of 9 mm×inner diameter of 4 mm×thickness of 3 mm, and into a plate shape of long side of 30 mm×short side of 20 mm×thickness of 5 mm, and the obtained molded body was sintered in an atmospheric air under 930° C. to 1000° C. for 3 hours.

A winding was applied to the obtained ring-shaped sintered body, and the initial magnetic permeability was measured by LCR meter, and the core loss (1 MHz, 50 mT) and BH loop at 3600 A/m were measured by BH analyzer. Moreover, a frame-shaped sample of long side of 8 mm×short side of 4 mm×thickness of 2 mm was cut from the plate-shaped sintered body, and a winding was applied to the sample and the magnetic permeability Iii was measured. Moreover, a pressure was applied uniaxially at 35 MPa, and change rate of the magnetic permeability μi before and after applying the pressure and the core loss $P_{CV}$ were measured.

As is apparent from FIG. 3, it was found that in Examples of the present invention, ferrites having a high magnetic permeability of 200 or more in which change of the magnetic permeability with respect to stress was small and in which the core loss under stress was small were obtained.

Embodiment 3

Material powders were mixed so as to finally become a specified main component composition ratio as shown in FIG. 4, and calcinated in an atmospheric air at 900° C. for 3 hours. $Bi_2O_3$ which was an accessory component and various accessory components except for $Bi_2O_3$ as shown in FIG. 4 were added in various amounts to the obtained calcinated powders, and the powders were dried after performing wet-grinding by a ball mill.

7% by weight solution of polyvinyl alcohol was added at 14% by weight to the obtained powders, and then granulated to be granulated powders, and the granulated powders were molded under a molding pressure of $14.7 \times 10^4$ kPa into a ring shape of external diameter of 9 mm×inner diameter of 4 mm×thickness of 3 mm, and into a plate shape of long side of 30 mm×short side of 20 mm×thickness of 5 mm, and the obtained molded body was sintered in an atmospheric air under 930° C. for 3 hours.

A winding was applied to the obtained ring-shaped sintered body, and the initial magnetic permeability was measured by LCR meter, and the core loss (1 MHz, 50 mT) and BH loop at 3600 A/m were measured by BH analyzer. Moreover, a frame-shaped sample of long side of 8 mm×short side of 4 mm×thickness of 2 mm was cut from the plate-shaped sintered body, and a winding was applied to the sample and the magnetic permeability μi was measured. Moreover, a pressure was applied uniaxially at 35 MPa, and change rate of the magnetic permeability μi before and after applying the pressure and the core loss $P_{CV}$ were measured.

As is apparent from FIG. 4, it was found that in Examples of the present invention, ferrites having a high magnetic permeability of 200 or more in which change of the magnetic permeability with respect to stress was small and in which the core loss under stress was small were obtained.

INDUSTRIAL APPLICABILITY

According to the present invention, as is apparent from Embodiments, there can be obtained characteristics that the magnetic permeability is 200 or more and that a change rate of the magnetic permeability when a pressure is applied at a pressure of 35 MPa is within ±10%, and a characteristic that a core loss at 1 MHz, 50 mT when a pressure is applied at a pressure of 35 MPa is 7000 kW/m³ or less can be obtained, and an inductor or a transformer having small core loss even becomes possible to be obtained even in the state of being molded with a resin.

The invention claimed is:

1. A ferrite material having a composition formula of $x(Li_{0.5}Fe_{0.5})O \cdot yZnO \cdot z(Mn, Fe)_2O_3$, and wherein in a case of a=Mn/(Mn+Fe), $Bi_2O_3$ is added from 0.2% by weight to 6% by weight, to a material in which x, y, z, and a in the composition formula and in the condition satisfy the following relations: $0.18 \leqq x \leqq 0.30$, $0.20 \leqq y \leqq 0.30$, $0.48 \leqq z \leqq 0.53$, $0.01 \leqq a \leqq 0.25$, and x+y+z=1.

2. The ferrite material according to claim 1, wherein a portion of the $Bi_2O_3$ is substituted with $V_2O_5$ and a lower limit of the amount of $V_2O_5$ added is set to 0.05% by weight, and an upper limit thereof is set to 0.5% by weight.

3. The ferrite material according to claim 1, wherein the amount of $Bi_2O_3$ is from 0.2% by weight to 4% by weight.

4. The ferrite material according to claim 1, wherein a 50% or less portion of ZnO is substituted with CuO.

5. The ferrite material according to claim 2, wherein a 50% or less portion of ZnO is substituted with CuO.

6. The ferrite material according to claim 3, wherein a 50% or less portion of ZnO is substituted with CuO.

7. The ferrite material according to claim 1, which contains 5% by weight or less of at least one of $ZrO_2$, $ZrSiO_4$, and $SiO_2$.

8. The ferrite material according to claim 1, wherein magnetic permeability is 200 or more, and a change rate of magnetic permeability when a pressure is applied at a pressure of 35 MPa is within ±10%.

9. The ferrite material according to claim 1, wherein a core loss at 1 MHz, 50 mT when a pressure is applied at a pressure of 35 MPa is 7000 kW/m³ or less.

* * * * *